B. THOMPSON & C. SELDEN.
MULTIPLE TELEGRAPH.
No. 255,698. Patented Mar. 28, 1882.
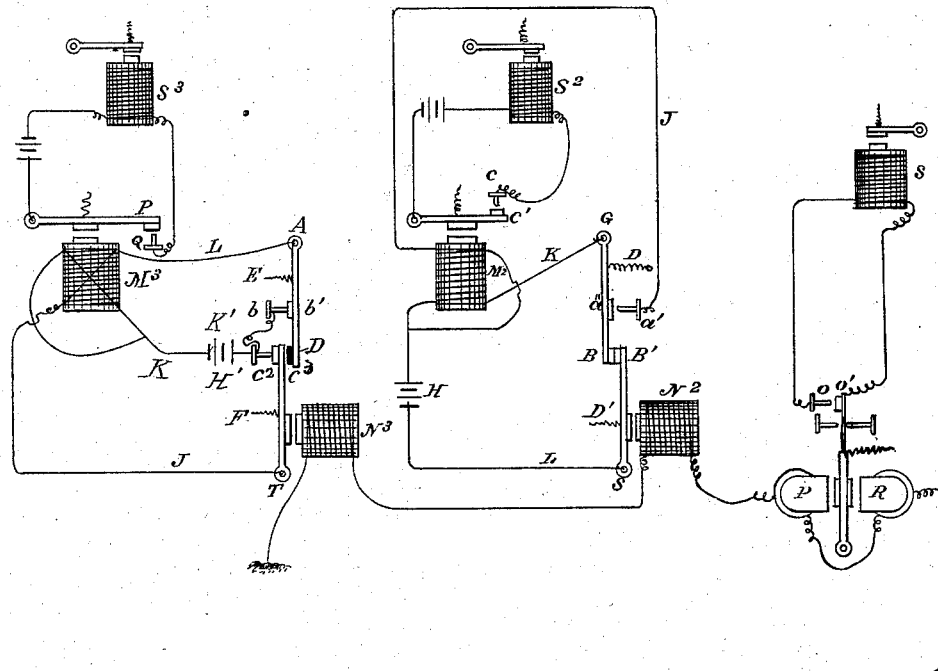
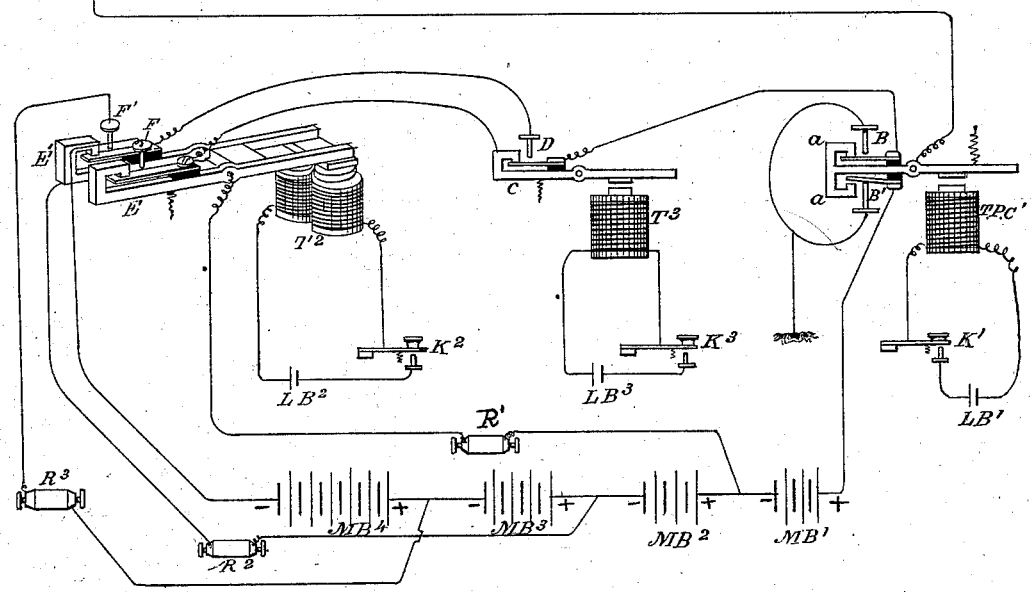
ATTEST:
Julian A. Hurdle.
Jno. L. Condron.
INVENTOR:
B. Thompson
Chas. Selden
Per Attys. A. H. Evans & Co.

UNITED STATES PATENT OFFICE.

BENJAMIN THOMPSON AND CHARLES SELDEN, OF TOLEDO, OHIO.

MULTIPLE TELEGRAPH.

SPECIFICATION forming part of Letters Patent No. 255,698, dated March 28, 1882.

Application filed March 10, 1879.

*To all whom it may concern:*

Be it known that we, BENJAMIN THOMPSON and CHARLES SELDEN, of Toledo, county of Lucas, and State of Ohio, have invented new and useful Improvements in Multiple Telegraphs; and we do declare the following to be a full, clear, and exact description of the invention, such as will enable one skilled in the art to which it pertains to make and use it, reference being had to the accompanying drawing, which forms part of this specification, in which the figure is a plan view, showing all the parts and connections.

Our invention relates to improvements in multiple telegraphs; and it consists in the combination, with a series of batteries arranged for potentials and polarities, of a peculiar construction and arrangement of transmitters, relays, and sounders, so that six telegrams can be transmitted on a single wire simultaneously—three messages each way—as will hereinafter be more fully described and claimed.

In the accompanying diagram four sections of a main battery of like or unlike intensity are shown at $MB'$, $MB^2$, $MB^3$, and $MB^4$. One pole of said battery is connected to one of the springs of a pole-changing transmitter, $TPC'$, while opposite poles of the various sections are connected to tension-changing transmitters $T^2$ and $T^3$, which are themselves connected to the other spring.

The pole-changing transmitter is of ordinary construction, and has the ordinary connections to line and to earth, so that when operated it transposes the connections and reverses the direction of the line-current by changing the poles of the battery from line to earth, and vice versa.

$K'$, $K^2$, and $K^3$ are Morse keys controlling the circuits of the local batteries $LB'$, $LB^2$, and $LB^3$, which serve to operate the transmitters proper through electro-magnets.

The construction and connections of the transmitters are as follows: Transmitter $T^2$ consists of two ordinary circuit-preserving keys yoked together, but insulated from one another. Their contact-springs are connected, the one with the hook and the other with the contact-stop of $T^3$. Lever $E$ and hook are joined to section of battery $MB'$ and lever $E'$ and hook to section of battery $MB^2$. The contact-stop of $E$ is connected to section of battery $MB^4$ and that of $E'$ to $MB^3$. The contact-spring of $T^3$ is connected with the upper contact-spring of pole-changer $TPC'$. Retracting-springs (not shown) hold the transmitters depressed when the Morse keys are open, so that the springs of $T^2$ and $T^3$ are connected to the lever-hooks, but are out of contact with their stops. In pole-changer $TPC'$ the upper spring is in contact with its hook, and so with line, while its lower spring, to which the battery is connected, being in contact with its stop, is disconnected from its hook and connected to earth. Under normal conditions section $MB'$ of battery only is to line, its circuit being to the hook and spring of $E$, transmitter $T^2$, to hook and spring of $T^3$, thence to upper spring and hook of $TPC'$, and to line, while its other pole is connected to earth through lower spring and contact $B'$ of the pole-changer $TPC'$. The connections of the other sections of battery are broken—$MB^4$ at contact-stop of $E$, $MB^3$ at contact-stop of $E'$, and $MB^2$, which is normally connected with hook and spring of $E'$, at contact-stop of transmitter $T^3$. When transmitter $T^3$ is operated it throws in an additional section of battery $MB^2$, the connections of $MB^3$ at $MB^4$ being broken, as before, while $MB^2$ and $MB'$ are to line through lever and hook $E'$ and spring, contact-stop of transmitter $T^3$ and its spring, and to pole-changer $TPC'$. Under these conditions the path for section $MB'$ alone is broken at the hook $C$ of transmitter $T^3$, at which point the spring has been removed from contact with the hook by coming into contact with the stop.

When transmitter $T^2$ alone is operated the whole battery is thrown into circuit through contact-stop of $E$, spring-hook of transmitter $T^3$, and its spring. The paths from sections of battery $MB'$, $MB^2$, and $MB^3$ are broken respectively at hook of $E$, hook of $E'$, and contact stop of transmitter $T^3$. If transmitters $T^2$ and $T^3$ are operated together, $MB^3$, $MB^2$, and $MB'$ are connected to line through stop and spring of $E'$, contact-stop, and spring of $T^3$. Section $MB^4$ is at the same time connected to spring of $E$ through its contact-stop; but its path to line is broken at the transmitter $T^3$, whose hook is disconnected from the spring.

In these operations, it will be observed, transmitters T² and T³ produce three distinct conditions of line-current. Transmitter T³, when operated, increases the strength of current normally flowing. Transmitter T² sends a current of a strength greater than that sent by T³, while both keys, when operated together, transmit a current of an intermediate strength.

The office of the pole-changer is simply to reverse the line-current, whether of the whole or a portion of the battery. When this transmitter is at rest the positive pole, say, of the battery is connected to earth and its negative to line by the paths already described. The operation of the transmitter places the lower spring in contact with the upper stop, B, which is connected to earth. The positive pole of the battery is then to line and its negative to earth. As the only path for the currents from the battery is through the springs of this transmitter, it is obvious that whenever the transmitter is operated it reverses the line-current whatever its strength.

The receiving-instruments consist of a polarized relay adapted to respond to changes in the polarity of current produced by transmitter T P C', and two relays, N² and N³, with differential repeating-sounders, supplemental contact-levers, and connections, so arranged as to receive without confusion the signals simultaneously or independently sent by transmitters T² and T³.

M² is a repeating-sounder, differentially wound, controlled by relay N², and in turn controlling by its back contact the circuit of the battery which operates the reading-sounder S².

The local battery H is connected, one pole to the armature-lever S and its other with the two differential coils of M², which are wound as ordinarily to neutralize one another's magnetizing effects in the core of M². The other terminals of the differential coils are connected the one with a supplemental contact-lever, G, and the other with a contact-stop, a', against which the contact a'' upon the supplemental lever rests under certain conditions of the apparatus. The levers S and G are provided with contact-points B and B', while retractile springs D and D', acting upon the levers, tend, the one, D', to withdraw the armature-lever from the pole of the relay and the other, D, to draw the supplemental lever into contact with its stop. The spring D' is of greater strength than D, and holds the supplemental lever out of contact with its stop against the influence of the spring D. The relay N² receives the signals sent by transmitter T², and sounder S² must therefore respond not only to the strongest currents transmitted, but also to the currents of an intermediate strength between the strongest and those sent by transmitter T³. It must not, however, respond to the currents sent by T³ alone, which increases the normal current only by the addition of section M B² of battery.

The action of the devices under these various conditions is as follows: When the current from M B' only is flowing to line the supplemental lever is held out of contact with its stop, because the spring D' is of sufficient strength to overbalance the attractive effects of the relay as well as the effects of spring D. The local of the reading-sounder S² is broken, because under these circumstances the circuit of but one of the differential coils of M² is closed—namely, that which is connected to the supplemental lever, and so through points B and B' and armature-lever S to the other pole of the battery—and the armature of M² is attracted. When the section of battery M B² is added to line the local of S² still remains open, since the strength of spring D' is sufficient to still hold the contacts a' and a'' broken. When three sections of battery are to line the armature-lever is drawn forward against force of D' until the supplemental lever rests against its contact, but is carried no farther, because then spring D does not assist the relay, and spring D' is of sufficient strength, when unopposed by D, to hold the lever S away from its front stop. Contacts B and B' and a' and a'' are then both closed, thus closing the circuit of both differential coils and practically demagnetizing M², so that its armature falls against its back contact and closes the circuit of the reading-sounder. When all four sections of battery are to line the relay N² carries the armature forward so as to break the contacts B and B', thus breaking both the differential circuits at the point B and allowing the armature of M² to fall back and complete the local of the reading-sounder.

If each section of battery be regarded as representing a unit of current strength, spring D' may be said to be adjusted above a current strength of 3, as also above a current strength of 2, aided by spring D. Battery 3, aided by spring D, is sufficient to carry the supplemental lever forward against its contact, but can carry the armature-lever no farther. Battery 4 will overcome the tension of spring D' unaided. It will thus be seen that armature S, when against its back stop, holds the reading-sounder local open, as the local battery is closed through one branch only of the differential electro-magnet. In its intermediate position it holds sounder local closed, as in that position both branches of the differential are closed, and in its extreme forward position it also holds sounder local closed, as the circuit of both coils of the differential relay is then broken.

Relay N³ receives the signals from transmitter T³. Its sounder must therefore respond not only to the weaker increased current caused by throwing in section of battery M B², but also to the current of intermediate strength, which flows when both transmitters T² T³ are closed. It must not, however, respond to the stronger increased current or the current from the whole battery, which is thrown to line by the operation of T².

The coils of the differential relay are both connected at one end to one pole of the local battery H', the other ends being connected respectively to the relay armature-lever and to the supplemental contact-lever.

The levers have independent contact $b$ and $c^2$, connected directly to the local battery, and are provided with retracting-springs E and F, preferably of unequal strength, and E greater than F. The levers are insulated from one another at the point where T engages with A. The differential repeating-sounder controls the reading - sounder through its front stop, as shown. While current from section M B' is acting upon relay $N^3$ the armature-lever is against its stop, the tension of spring F being sufficient to resist the attraction of the relay electro-magnet. The supplemental contact-lever is also against its stop, and both branches of the differential electro-magnet are closed, so that $M^3$ exercises no attractive effect upon its armature and the reading - sounder local is open.

The current from both sections of battery M B' and M B$^2$ is sufficient to overcome the strength of retractile spring F, thus separating contacts $c^2$ $c^3$, breaking the circuit of the local battery through one coil of the differential electro-magnet. The circuit of the other coil remains closed at $b$ $b'$, because the strength of $N^3$, when charged by two sections only of battery, is insufficient to overcome the united strength of E and F, which it must do when T is acting upon A in order to break the contact $b$ $b'$. Relay $M^3$ thereupon attracts its armature and closes the local of the reading-sounder. The tension of E is such that three sections of battery, M B', M B$^2$, M B$^3$, are also insufficient to overcome its strength, together with that of F, although they are sufficient to overcome F alone and break the contact $c^2$ $c^3$, and the conditions are the same in the last instance, one branch of the differential being open and the other closed. The four sections of battery, M B', M B$^2$, M B$^3$, M B$^4$, are sufficient to overcome both springs F and E. Both branches of the differential are then broken at $b$ and $c^2$, and the effect is the same as when both are closed. The armature of $M^3$ is unaffected, so that the local of $S^3$ remains open.

The general operation of the devices is as follows: The normal current flowing to line from M B' when all the transmitters are at rest is of such a polarity that it holds the local of polar relay open, and is not sufficiently strong to overcome the tension of the retractile springs on armature-levers of $N^2$ and $N^3$, which are simply neutral electro-magnets. The operation of pole-changer T P C' reverses the polarity of this section, however, and the polar relay responds, closing its local circuit. The operation of transmitter $T^3$ throws in an additional section of battery M B$^2$. The united current of M B' and M B$^2$ is sufficient to draw forward armature-lever T, and sounder $S^3$ will respond. Sounder $S^2$ is unaffected, because the tension of D' is so great that lever S is not moved. This action of course takes place whatever the polarity of the current, and polar relay P R may therefore be simultaneously affected by operating the pole-changer T P C'. Transmitter $T^2$ connects the whole battery to line. Armature-lever S is carried forward against the tension of spring D', so as to break the circuit at B, and sounder $S^2$ therefore responds. $S^3$ does not respond, because the strength of the current is sufficient to overcome the tension of both springs E and F, thus breaking both contacts $b$ and $c^2$. When both transmitters $T^2$ and $T^3$ are operated a current of intermediate strength, or one from the three sections of battery M B'; M B$^2$, M B$^3$ flows to line. Both sounders $S^2$ and $S^3$ respond, because in the one case the tension of D' is so great that the contact B cannot be broken when $a'$ is closed, and in the other the strength of current is insufficient to overcome the tension of both springs F and E, so as to break both contacts $b$ $b'$ and $c^2$ $c^3$. In neither of these conditions is the polar relay affected, the current not being of the proper polarity.

Transmitter T P C' may, however, be simultaneously operated to cause sounder $S'$ to respond without disturbing the action of $N^2$ or $N^3$, since the latter are neutral relays, and are affected by the operation of the proper transmitting - keys, whatever the polarity of the current transmitted.

In the diagram we have shown, for the sake of simplicity, the devices used in transmitting three messages in the same direction only. In order to send six messages—three in one and three in the opposite direction—it is only necessary to duplicate the apparatus and arrange the same so that the receiving devices at each end of the line shall be affected only by the changes of current produced at the opposite end. This may be done by differential winding of the relays and the addition of an artificial line, rheostats, &c., or in any other of the well-known ways. The resistances R' R$^2$ R$^3$ are to compensate for the internal resistance of the batteries. R' is approximately equal to the resistance of M B$^2$ M B$^3$ M B$^4$, R$^2$ to that of M B$^3$ M B$^4$, and R$^3$ to that of M B$^4$. By this arrangement the total resistance of the circuit is the same under all conditions of the tension-keys, and is unaffected by any changes in the total number of cells of battery in circuit. This is a matter of considerable importance when the devices are used for sending in opposite directions, as it is desirable that the resistance to the transmitted currents from one end of the line should not be affected by any changes in the key system at the other end, through which a portion of the transmitted currents passes.

The arrangement of the neutral relays and their local circuits herein described presents this novel feature over previous arrangements of the receiving-relays on lines where two independent messages are sent in the same direction by changes of tension only in the line-current—viz., that the local circuits of the two relays are entirely independent of one another, neither depending for its operative condition upon the position of the contact levers or stops of the other local circuit. In previous arrangements of these devices a portion of the local circuit of one relay has been through the contact stops or points of the other, or has been so conjoined with the local circuit for said second relay that the operation of the instruments in it was interfered with by the movement of said second relay. In our arrangement each relay can affect its local circuit at all times in the same way without regard to the condition of the other relay. This result we believe that we are the first to attain in connection with multiple-telegraph receiving apparatus worked by changes of tension of the current without regard to the polarity of said current. In other arrangements of the receiving-relays the independence of action of said relays upon their local circuits necessary to the reception of the two distinct messages has been secured by making one relay, under certain conditions, close a local circuit through a demagnetizing-coil upon the other, a well-known example of this arrangement being found in the duplex of Stark. This arrangement also presents certain difficulties which prevent perfect independence of action of the two relays in controlling the receiving-instruments belonging to each.

What we claim as our invention is—

1. A differential repeating-sounder, a local battery, supplemental contact-lever, and a conducting-stop therefor, in combination with an armature-lever which, when fully attracted, breaks the circuit of the local battery through both coils of the differential sounder, substantially as described.

2. A receiving electro-magnet, an armature-lever therefor, and a supplemental contact-lever, in combination with a repeating-sounder and a reading-sounder, the whole so arranged that the local of the reading-sounder will be broken when the armature-lever of the receiving-relay is against its back stop, but closed when said armature-lever is either in an intermediate position or against its front stop.

3. A differential electro-magnet and a local battery, one pole of which is connected directly to the relay-armature, the other pole being connected to one end of both coils of the differential electro-magnet, in combination with a supplemental contact-lever connected to the other end of one of the differential coils.

4. A differential electro-magnet and a local battery connected directly to the relay armature-lever, in combination with a supplemental contact-lever connected to one of the differential coils and arranged to make contact with the relay armature-lever on the side opposite the relay electro-magnet.

5. A differential electro-magnet, a local-circuit battery connected thereto, and a relay armature-lever connected directly with one pole of said battery, in combination with a supplemental contact-lever connected to one of the differential coils and making contact on one and the same side with the relay armature-lever, and with a stop connected to the other of the differential coils.

6. The combination of a differential electro-magnet, a local battery therefor, a relay armature-lever connected directly to one pole of the local battery, a supplemental contact lever and stop connected to the differential coils, and springs so applied to said levers as to oppose one another's action when the levers are in contact with one another.

7. A relay armature-lever connected directly with one pole of local battery, whose other pole is connected to a differential electro-magnet, and a supplemental contact-lever with stops and connections, substantially as described, in combination with retractile springs so applied to said levers as to oppose one another's action, and so adjusted that the armature-lever shall overcome the spring of the supplemental lever.

8. The combination of a differential electro-magnet, a local battery therefor, a relay armature-lever, and a supplemental contact-lever in circuit with one coil of the differential electro-magnet when against its stop, and so arranged with relation to the relay armature-lever as to be removed from said stop when the armature is carried forward against the stress of its retracting-spring.

9. The combination of a differential electro-magnet, a local battery, a relay armature-lever, an electrical back contact therefor, and a supplemental lever and electrical back contact for the latter, and connections, substantially as described, so that both differential coils will be closed when the relay armature-lever is against its back contact.

10. The combination of a differential electro-magnet, a local-circuit battery, a relay armature-lever, an electrical back contact therefor, connected directly with one pole of the local battery, and a supplemental contact-lever whose stop is connected with the same pole of the local battery, so that when the armature-lever is fully attracted both coils of the differential electro-magnet are out of circuit, but when partially drawn forward the local-battery circuit through one of said coils is closed.

11. The combination of an armature-lever provided with a back contact-stop, and a supplemental lever having a contact-stop upon the same side as the armature-lever, so that the latter, when moved forward to break its own circuit, may also break the circuit formed by the supplemental lever.

12. The combination of an armature-lever provided with a back contact-stop, a supplemental contact-lever provided with an independent contact-stop upon the same side as that of the armature-lever, and retracting-springs so applied to both levers as to oppose the action of the relay electro-magnet.

13. The combination of an armature-lever provided with a back contact-stop, and a supplemental lever, also having a contact-stop, and insulated from said armature-lever, in combination with retractile springs acting upon said levers in the same direction, the spring for the supplemental lever being adjusted to higher tension than that of the armature-lever.

14. In combination in a multiple telegraph, a main-line magnet, $N^2$, with armature-lever S, point B′, and tension-spring D′, and swinging supplemental contact-lever G, points B $a'$ $a''$, and tension-spring D, local battery H, one pole of which is connected directly to the main armature-lever S, and differentially-wound local upstroke electro-magnet $M^2$, with its connecting-wires J, K, and L, substantially as and for the purpose set forth.

15. In a multiple telegraph, the main-line magnet $N^3$, with armature-lever T, tension-spring F, points $c^2$ $c^3$, swinging supplemental contact-lever A, insulated at its extremity at a point on the opposite side of lever T from contact $c^3$, points $b$ and $b'$, and tension-spring E, substantially as and for the purpose set forth.

16. In a multiple telegraph, the main-line magnet $N^3$, in combination with levers A and T, provided with independent electrical contact-stops electrically connected together and to the same pole of the local battery, and tension-springs acting on said levers in the same direction, but with unequal strength.

17. In a multiple telegraph, the main-line electro-magnet $N^3$, in combination with armature-lever T, tension-spring F, points $c^2$ $c^3$, swinging supplemental lever A, and points $b$ $b'$ and $D^3$, spring E, local battery H′, differentially-wound local magnet $M^3$, and its armature and points P Q, with connecting-wires J, K, K′, and L, substantially as and for the purpose set forth.

18. In a multiple telegraph, main battery M B′ M $B^2$ M $B^3$ M $B^4$, in combination with the transmitters T P C′, $T^2$, and $T^3$, local batteries L B′ L $B^2$ L $B^3$, and keys K′, $K^2$, and $K^3$, and their connecting wires and points, substantially as shown and described.

19. In a multiple telegraph, the transmitters T P C′, $T^2$, and $T^3$, in combination with main battery M B′ M $B^2$ M $B^3$ M $B^4$ and inserted resistances R′ $R^2$ $R^3$, connected substantially as shown and described, and for the purpose set forth.

20. In a multiple telegraph, the transmitter T P C′, with its circuit-connections, as described, whereby it acts as a pole-changer irrespective of the position of the transmitters $T^2$ $T^3$, in combination with said transmitters $T^2$ $T^3$ and circuit connections and points, as described, whereby the latter of said transmitters, when operated alone, places main-line battery M B′ M $B^2$ M $B^3$ M $B^4$ to line, and when operated simultaneously with $T^2$ places main battery M B′ M $B^2$ M $B^3$ to line, for the purpose herein set forth.

21. The combination of a double-point tension key or transmitter, $T^2$, batteries M $B^4$, M $B^3$, and M $B^2$, connected in the manner described to said key, and a single-point key or transmitter $T^3$, whose spring is connected to a pole-changer, substantially as described.

22. The combination, substantially as described, of two receiving-relays for responding to changes of tension in the main-line circuit irrespective of polarity, independent local circuits for said relays, and two tension-transmitters for sending two messages over the same wire by variations of tension without reversal of polarity.

23. The combination, substantially as described, of two intensity-transmitters at the transmitting-station of a telegraph-line and two locally-independent neutral relays in the main line at the receiving-station.

BENJAMIN THOMPSON.
CHARLES SELDEN.

Witnesses:
  E. F. MUNGER,
  GEORGE R. MILLER.